United States Patent [19]
Azuma et al.

[11] Patent Number: 5,631,532
[45] Date of Patent: May 20, 1997

[54] FUEL CELL/BATTERY HYBRID POWER SYSTEM FOR VEHICLE

[75] Inventors: Ryuji Azuma, Hekinan; Takeshi Hara, Chiryu; Kenji Kato, Aichi-ken, all of Japan

[73] Assignees: Kabushikikaisha Equos Research; Aisin Aw Co., Ltd, both of Japan

[21] Appl. No.: 332,818

[22] Filed: Oct. 31, 1994

[30] Foreign Application Priority Data

Feb. 24, 1994 [JP] Japan .................................. 6-053327

[51] Int. Cl.$^6$ .................................................. H01M 10/46
[52] U.S. Cl. ................................................ 320/5; 320/61
[58] Field of Search ............................ 320/2, 5, 39, 40, 320/61, 1 J, 6; 180/65.3, 65.4; 429/12, 19

[56] References Cited

U.S. PATENT DOCUMENTS

| | | | |
|---|---|---|---|
| 3,823,358 | 7/1974 | Rey | 320/3 |
| 4,081,693 | 3/1978 | Stone | 320/61 X |
| 4,670,702 | 6/1987 | Yamada et al. | 320/21 |
| 4,931,947 | 6/1990 | Werth et al. | 320/3 X |
| 4,961,151 | 10/1990 | Early et al. | 320/15 X |

FOREIGN PATENT DOCUMENTS 3276573  12/1991  Japan .
5151983   6/1993  Japan .

*Primary Examiner*—Edward H. Tso
*Attorney, Agent, or Firm*—Lorusso & Loud

[57] ABSTRACT

A hybrid type power source control system controls the output of a fuel cell, with disregard of the operation of the vehicle accelerator pedal, responsive to the detected amount of residual charge of the battery, which amount fluctuates as the vehicle travels. For example, the output of the fuel cell system 3 might be 3 kW when the residual charge is from 70% to 90%, 5 kW when the residual charge is from 70% to 60% and 10 kW when the residual charge is below 60%. Consequently, the fuel cell system 3 can generate power with an efficiency of from 30% to 33% and can charge the battery 1 effectively. Because the output of the fuel cell is fixed for each of the rather broad ranges of residual battery charge, thermal fatigue of the fuel cell is prevented because of little output fluctuation. When the electric motor is continuously operated, the fuel cell continuously charges the battery to maintain a fully charged stated, optionally with some allowance for fluctuation thereof. When a fixed charge time is manually input, the output of the fuel cell is selected to fully charge (90%) the battery during the time selected.

9 Claims, 12 Drawing Sheets

FIG.8(a)

| DECREASING RATE<br>CHARGING AMOUNT | HIGH | MIDDLE | LOW |
|---|---|---|---|
| HIGH | Q55 | Q53 | Q53 |
| MIDDLE | Q55 | Q55 | Q53 |
| LOW | Q510 | Q510 | Q55 |

FIG.8(b)

| INCREASING RATE<br>CHARGING AMOUNT | HIGH | MIDDLE | LOW |
|---|---|---|---|
| HIGH | Q53 | Q53 | Q53 |
| MIDDLE | Q53 | Q55 | Q55 |
| LOW | Q55 | Q510 | Q510 | ns
FUEL CELL/BATTERY HYBRID POWER SYSTEM FOR VEHICLE

BACKGROUND OF THE INVENTION

1. Field of the Invention

The present invention is concerned with a hybrid type power source for an electric motor drive of an electric vehicle, including a storage battery and a fuel cell.

2. Description of the Related Art

Recently, because of environmental concerns, electric vehicles have received attention as possible replacement for gasoline engines which are a source of noxious gasses.

It is known that the typical storage battery used for an electric vehicle has a large output capacity but a comparatively small energy capacity. For this reason, the mileage per charge for the conventional electric vehicle, having such a storage battery as an electric power source, is approximately 100 kilometers. In contrast, a modern gasoline engine vehicle has a range of approximately 400 to 500 Km on one full tank of gasoline.

In order to increase the range of an electric vehicle, a hybrid type power plant, composed of a fuel cell having a small output capacity but a large energy capacity and a chargeable storage battery, has been developed. Such hybrid type power plants have been utilized, for example, in experimental electric vehicles such as buses and golf-carts.

Japanese Patent Kokai (Laid-open) No. 3-276573 discloses such a hybrid type electric vehicle wherein the degree of depression of an accelerator pedal is input to a computing unit (CPU) through a potentiometer. The CPU adds a signal from a battery residual charge meter to a load command which varies in accordance with operation of the accelerator pedal, computes an amount of fuel gas to be supplied to the fuel cell, and feeds a signal based on that computation to a control device 57. The control device controls a chopper, also on the basis of the result of that computation, and supplies power to the vehicle in accordance with the degree of depression the accelerator pedal 55. The control device 57 also controls a flow control servo valve and an air blower on the basis of signals issued from the computing unit to supply the necessary electric power for driving the vehicle with the chopper to thereby regulate output of the fuel cell 51.

In electric vehicles the fuel cell has been utilized mainly as a supply source of electric power to an electric motor, in accordance with the vehicle load. A battery is utilized to compensate for poor output of the fuel cell, which occurs when the vehicle rapidly accelerates and the load increases, and is adapted to be charged by power from the fuel cell 51 during periods of light load.

Another example of a hybrid type power source for an electric vehicle is disclosed in Japanese Patent Laid-open No. 5-151983. The power supply in this hybrid type changes output of the fuel cell over a range of from 0 to 100%, promptly reacts to a rapid change of an external load, and produces a load follow-up generation.

SUMMARY OF THE INVENTION

In the hybrid type electric power source device of the present invention, battery residual charge is detected by a battery residual charge detection means. Fuel cell output control means determines the one range, of plural ranges for battery charge, which encompasses the detected battery residual charge. The fuel cell output control means commands a fuel cell to provide output voltage as long as the residual charge remains within that same (one) range.

When approval state detection means detects disapproval of the electric motor drive (that the motor is inoperative), the fuel cell output control means does not stop the output command to the fuel cell output immediately, but continues the output command to the fuel cell.

Accordingly, one object of the present invention is to provide a hybrid type power supply in which a fuel cell is utilized with superior efficiency.

Another object of the present invention is to prevent thermal fatigue of the fuel cell by frequent change of the output.

Still another object of the present invention is to make it possible to charge a battery during the period when the electric motor is inoperative.

Yet another object of the present invention is to charge the battery by manual input of a charge period.

BRIEF DESCRIPTION OF THE DRAWINGS

Still other objects and advantages of the present invention will become readily apparent to those skilled in this art from the following detailed description, wherein preferred embodiments of the invention are shown and described, by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

FIG. 4(a), in particular, shows vehicle driving speed change with time; and FIG. 4(b) shows both battery residual charge and fuel cell power corresponding to the changes in vehicle speed with time shown in FIG. 4(a);

FIGS. 8(a) and 8(b) are tables for selection of an output value for an output change command signal to be issued from an electric vehicle control unit in accordance with the first embodiment;

DETAILED DESCRIPTION OF THE PREFERRED EMBODIMENT(S)

Figure 1:
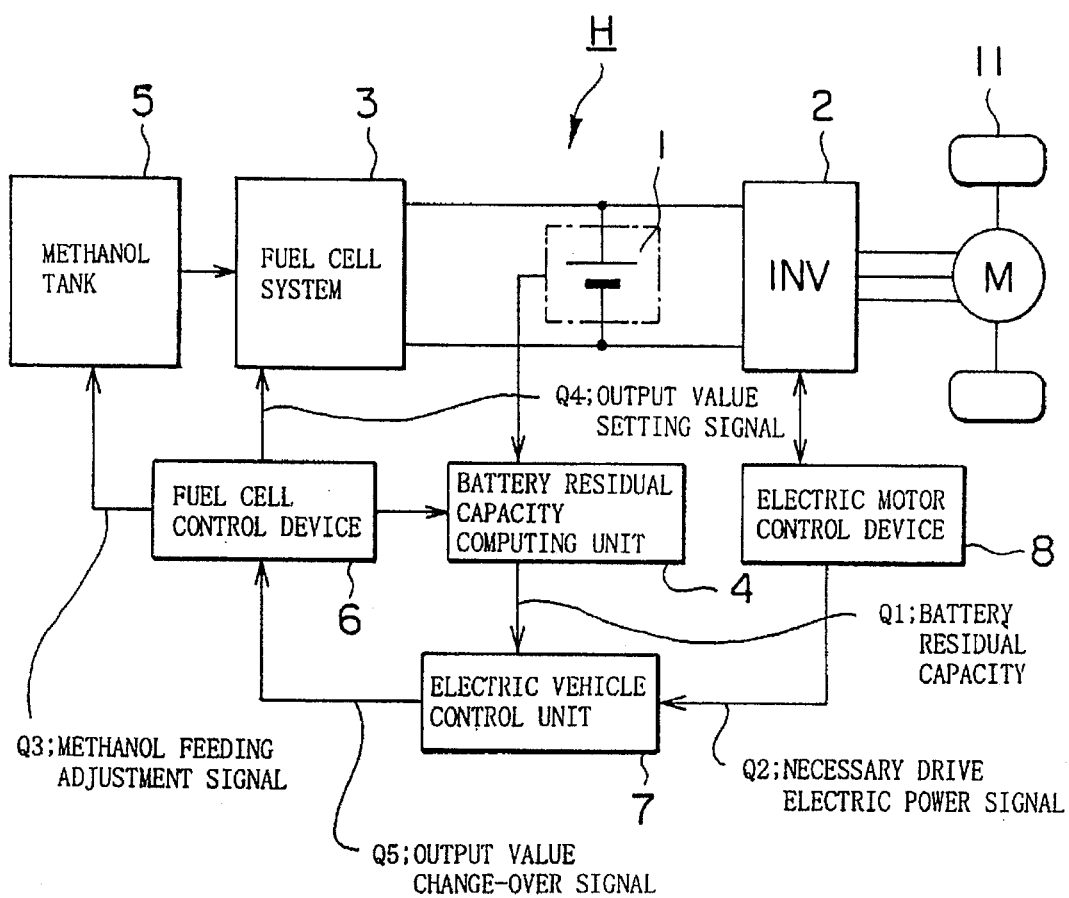
FIG. 1 is a block diagram of a hybrid type power supply system for an electric vehicle in accordance with a first embodiment of the present invention.

FIG. 1 shows a hybrid type H power supply system provided with a battery 1 for supplying electric power to drive an electric motor M which, in turn, drives the electric vehicle. A chargeable storage battery such as a lead storage battery, nickel-cadmium storage battery, sodium sulfide storage battery, lithium storage battery, hydrogen storage battery, redox-type battery, or the like may be used as the battery 1. The battery 1 generates 240 V and, for example, consists of plural storage batteries connected in series or in serial-parallel. The battery 1 of the present embodiment consists of 20 battery cells of 12 V each, electrically connected in series.

The battery 1 should provide sufficient capacity to supply the electric power required for a rapid increase in load due to rapid acceleration commanded by operation of the accelerator pedal.

The battery 1 is connected to an inverter 2 which converts direct current to alternating current and is also connected to a fuel cell system 3 which contains an evaporation portion, reforming portion (not-shown), and others. The fuel cell system 3 may be, for example, a phosphoric acid fuel cell (PAFC), molten carbonate fuel cell (MCFC), solid oxide fuel cell (SOFC), solid polymer electrolyte fuel cell (PEFC) or the like.

The battery 1 is connected to a battery residual charge computing unit 4. The battery residual charge computing unit 4 functions as a battery residual charge detection means for detection of the chargeable residual capacity of the battery 1.

The battery residual capacity computing unit 4 computes electric power from the battery 1 consumed by the inverter 2 in driving an electric motor M based on the rate of drop in terminal voltage of the battery 1, upon drawing a given electric current, and thereby computes electric power consumption. A fuel cell control device 6 supplies an output value setting signal Q4 commanding a given output from the fuel cell system 3. Based on the output value setting signal Q4, the battery residual charge computing unit 4 computes the residual charge available in the battery 1. The battery residual charge computing unit 4 can accurately compute the residual charge from the computed charge capacity and the computed consumption of electric power.

In the alternative, the battery residual charge computing unit 4 may detect terminal voltage of the battery 1 and compare it, for example, with a value predetermined for the same electric current and thereby determine the chargeable residual capacity of the battery 1 from the relationship between battery voltage and battery capacity.

In another option, the battery residual capacity computing unit 4 computes residual charge by monitoring the density of the battery electrolytic solution by means of an optical detector.

In another alternative, the battery residual capacity computing unit 4 may determine chargeable residual capacity of the battery 1 by measuring electric discharge of the battery 1.

In yet another alternative, the battery residual charge computing unit 4 may determine the residual charge of the battery 1 by monitoring the drop in electric discharge voltage with time when the battery discharges electricity.

Now referring to the inverter 2, as can be seen from the drawings, it is located between the battery 1 and the electric motor M mounted on vehicle 11 and is connected to an electric motor control device 8.

A brushless DC electric motor, for example, may be used as the electric motor M. The electric motor control device 8 controls the inverter 2 in accordance with a signal from an accelerator pedal (not-shown). The inverter 2 controls movement of the electric vehicle by converting direct current electric power from the battery 1 into alternating current, under control of the electric power control device 8, and supplies the alternating current to the electric motor M.

The electric motor control device 8 generates an electric power signal Q2 corresponding to the electric power of the battery 1 consumed, when operating the electric motor M, by the inverter 2 and supplies that signal to an electric vehicle control unit 7 which includes a microprocessor with CPU (central process unit), ROM (read only memory) storing several programs and data, RAM (random access memory) utilized as a working memory, and others. The RAM includes a flag program to change first, second and third flags to ON or OFF in accordance with the battery 1 condition. The electric vehicle control unit 7 controls the entire operation of the electric vehicle and supplies an output change command signal Q5 to a fuel cell control device 6 in order to control output of the fuel cell system 3 to provide a combined efficiency of from 30 to 40% in conformity with the battery residual charge signal Q1 computed by the battery residual charge computing unit 4.

Figure 7:
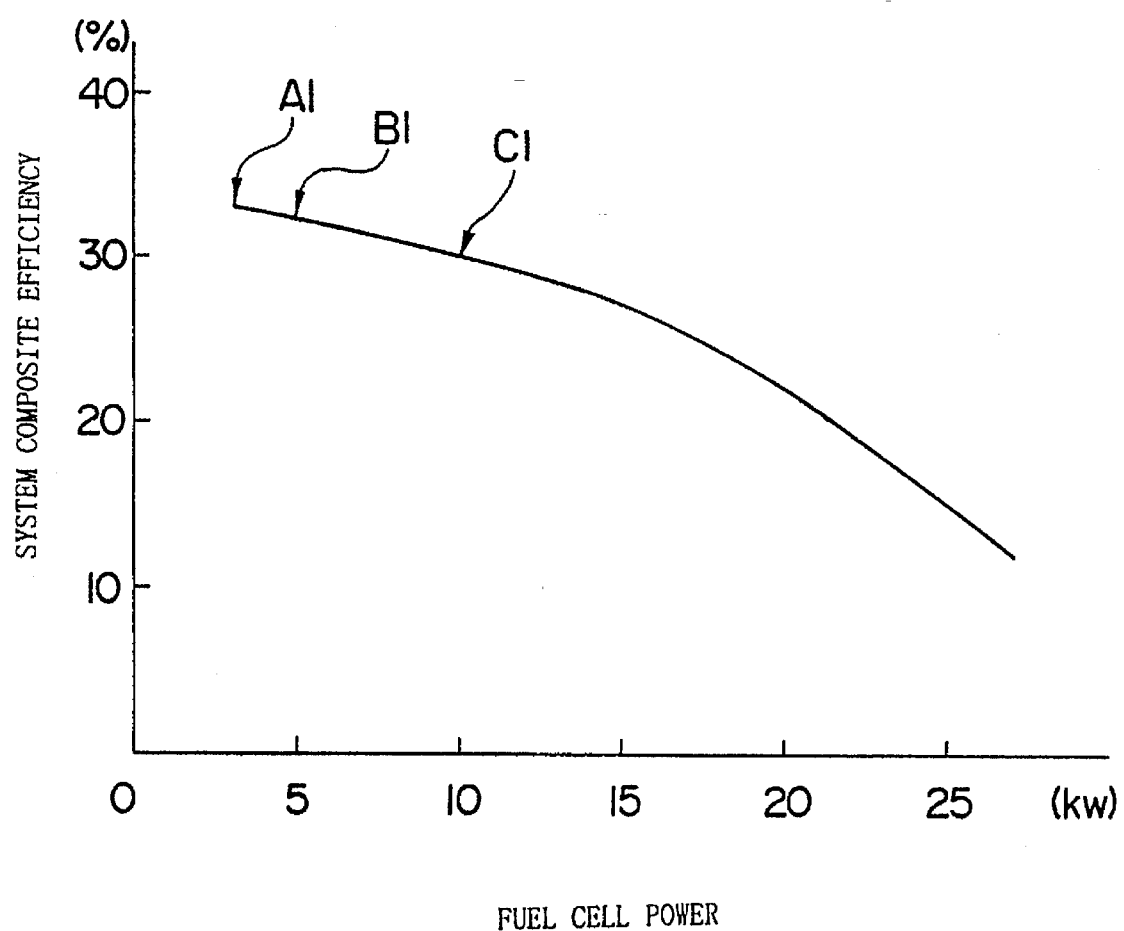
FIG. 7 is a graphical representation of output efficiency of the fuel cell.
Figure 9:
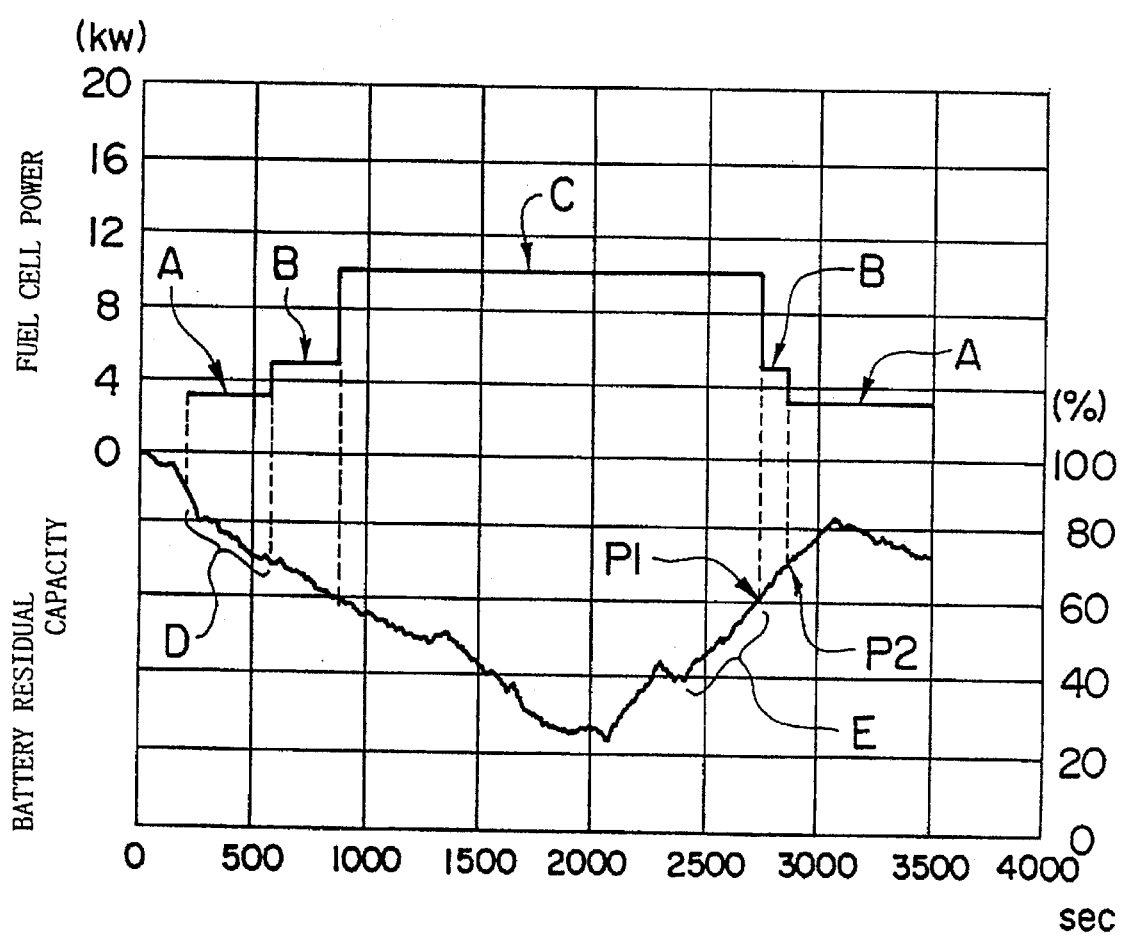
FIG. 9 is a graphical representation, similar to FIG. 4(b), showing variation of both battery residual charge and fuel cell output, corresponding to changes in vehicle speed with time as shown in FIG. 4(a)

As shown in FIG. 7, the fuel cell (stack of fuel cell units) has a system composite efficiency (=conversion efficiency) which drops with an increase of the output value. In the present embodiment, the output of the fuel cell system 3 is selected from within the high range of the system composite efficiency by separating control of the fuel cell output from operation of the accelerator pedal.

The system composite (overall) efficiency depends upon overall conversion efficiency of the stacked fuel cell units, fuel gas feed pressure to the fuel cell units, reformer thermal efficiency, efficiency of conduction of electricity between the fuel cell units within the stack, and other factors. The electric vehicle control unit 7 functions as a part of the battery residual charge detection means which monitors fluctuation in the residual charge of the battery 1 and outputs an output change command signal Q5 in accordance with the computed residual charge. The fluctuation of the residual charge of the battery 1, is computed by the electric vehicle control unit 7 based on a drive power demand signal Q2 from the electric motor control device 8 and sends an output change command signal Q5 to the fuel cell control device 6.

The output change command signal Q5 output from the electric vehicle control unit 7 is one of Q53, Q55 and Q510 (see FIGS. 8(a) and 8(b)). These output change command signals, Q53, Q55 and Q510, are signals which command the fuel cell control device 6 to operate the fuel cell system 3 to output 3 kW, 5 kW or 10 kW, respectively.

The electric vehicle control unit 7 selects a high range for system composite efficiency (for example, the range of from 30 to 40%) and directs the output of the fuel cell system 3 according to the actual state of the battery 1. Incidentally, an output of 10 kW from the fuel cell system 3 (efficiency 30% indicated at C1 in FIG. 4) indicates a rather lower system composite efficiency as compared to output at 3 kW (efficiency 32% shown at B1 in FIG. 4) and output at 5 kW (efficiency 33% shown at A1 in FIG. 4), but it can be an acceptable upper limit for an expected level of high efficiency.

The fuel cell system 3 is connected to a methanol tank 5 and both the fuel cell system 3 and methanol tank 5 are connected to the fuel cell control device 6.

The fuel cell control device 6 sends a methanol feed signal Q3 to the methanol tank 5 so that the output from the fuel cell system 3 corresponds to an output value dictated by output change command signal Q5 generated by the electric vehicle control unit 7 and to the output value setting signal Q4 to the fuel cell system 3.

An amount of methanol corresponding to the methanol feed adjustment signal Q3 is supplied to the fuel cell system 3 from the methanol tank 5. The fuel cell system 3 reforms the supplied methanol into fuel consisting mainly of hydrogen, supplies oxygen corresponding to the output value setting signal Q4 and thereby charges the battery 1 at a voltage corresponding to the residual charge of the battery 1 and its rate of fluctuation.

The control sequence for the hybrid type H power system of the foregoing embodiment will be explained in more detail below.

The first operation to be described is the control of charging of the battery 1 by changing the output of the fuel cell, while operating within a range of high efficiency, in accordance with the residual charge of the battery 1 determined by the battery residual charge computing unit 4.

(A) OVERALL OPERATION

Figure 2:
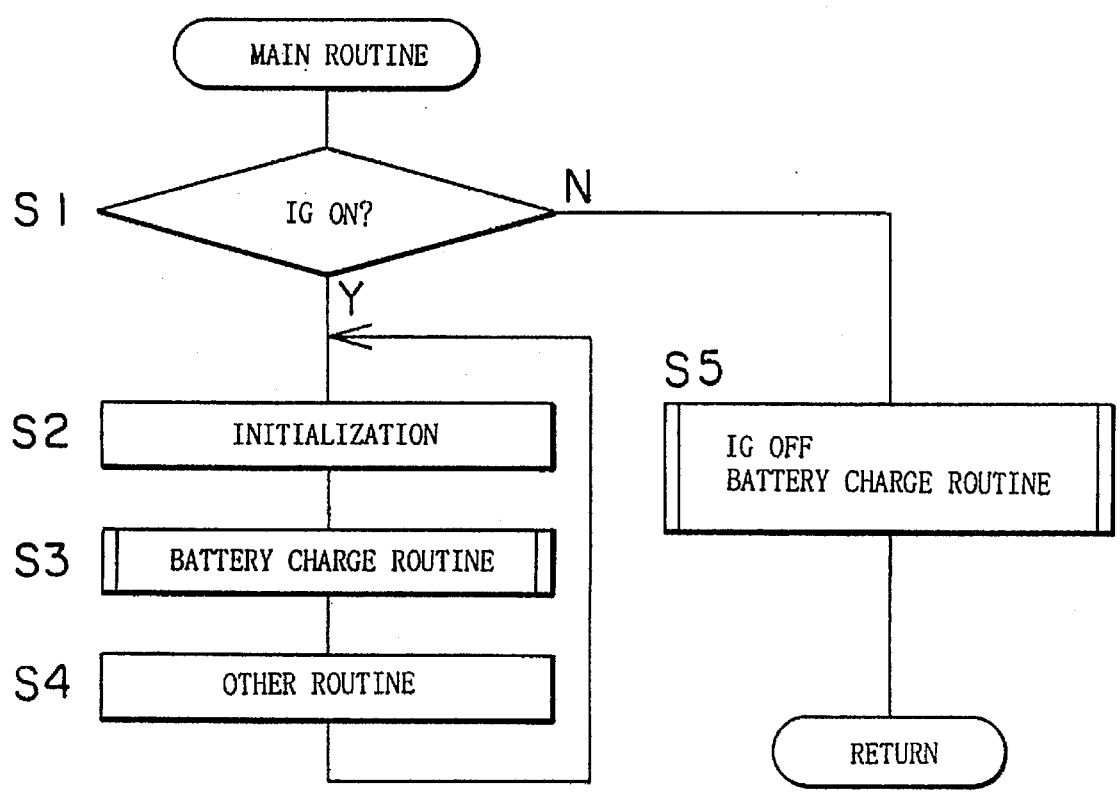
FIG. 2 is a flow chart showing the operational sequence of the main routine for control employed in the first embodiment.

FIG. 2 depicts a main routine for the overall control scheme for the hybrid type H power supply of the first embodiment.

As shown in FIG. 2, an ignition and starting switch (herein after referred to "IG") is checked to determine whether it is ON or OFF in the first step and when IG is ON ("Y" in step 1), the process proceeds through several controls performed by the electric vehicle control unit 7 (step 2). The process then proceeds through a battery charge routine (step 3), and after the battery charge routine, through other process routines (step 4) and then returns to step 2.

On the other hand, when IG OFF is detected in the step 1 ("N" in step 1), the process finishes after completion of a IG OFF battery charge routine. In the IG OFF battery charge routine the operation of the fuel cell system 3 does not stop soon after IG becomes OFF; rather, while IG is OFF, the output of the fuel cell system 3 is continued until the battery 1 becomes "fully charged", for example, charged to more than 90% of charge capacity, and thereafter the fuel cell system output to the battery stops.

(B) BATTERY CHARGE ROUTINE

Figure 3:
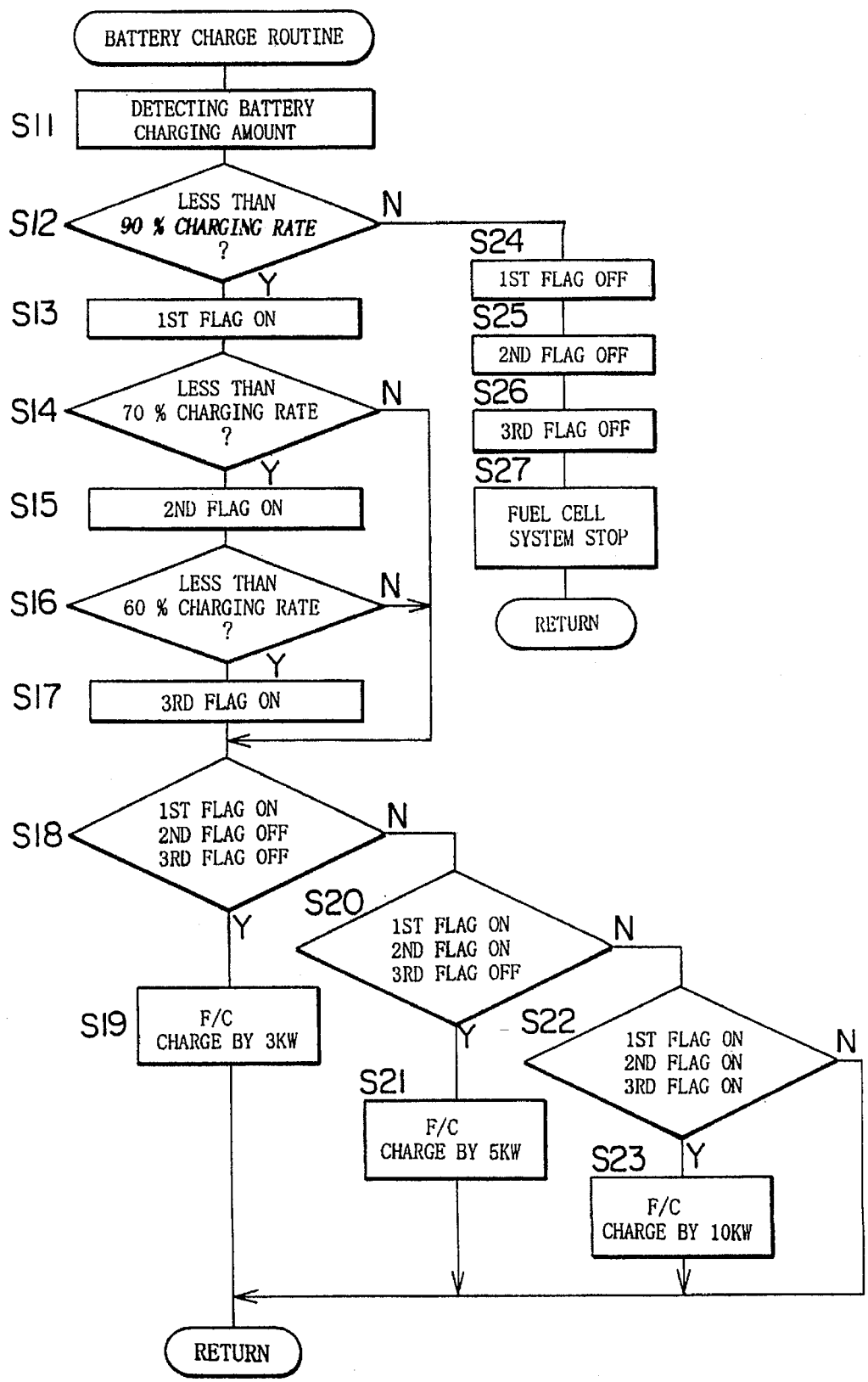
FIG. 3 is a flow chart showing a battery charge routine which may be used in the first embodiment.

FIG. 3 depicts the battery charge routine of step 3 in FIG. 2.

As shown in FIG. 3, the battery residual capacity computing unit 4 computes the present charge in the battery 1 ("battery residual charge") from the consumption of electric power from the battery 1 and the amount of charge input to the battery from the fuel cell system 3 and the computed value is supplied as a signal Q1 to the electric vehicle control unit 7 (step 11).

When the detected present charge is below 90% capacity ("Y" in step 12), the electric vehicle control unit 7 turns ON the first flag (a "below 90% flag") in a flag zone stored in RAM (not shown), and turns ON (in step 15) the second flag (a "below 70% flag") if the current charge of the battery 1 is found to be below 70% capacity in step 14. Subsequently, a third flag (a "below 60% flag") is turned ON (step 17) if the present charge of the battery 1 is below 60% (step 16).

When the first flag, the second flag and the third flag are respectively ON, ON, and OFF (step 18), the present charge of the battery 1 is in the comparatively high range of from 70% to 90%. Therefore, there is no need to rapidly charge the battery 1 and the electric vehicle control unit 7 supplies the output change command signal Q53 in order to utilize the fuel cell system 3 at its maximum efficiency, i.e. at its lowest output of 3 kW.

Consequently, the output value setting signal Q4 corresponding to 3 kW is sent from the fuel cell control device 6 to the fuel cell system 3 and the battery 1 is charged with the highest efficiency output of 3 kW (corresponding to A1—about 33% in FIG. 7) (step 19). In step 18, when the first flag, the second flag, and the third flag are not respectively ON, OFF, and OFF ("N" in step 18), a determination is made as to whether they are ON, ON, and OFF (step 20). When the first flag, the second flag, and the third flag are respectively ON, ON, and OFF ("Y" in step 20), the charge stored in the battery 1 is in the range of from 60% to 70% and the battery 1 does not need a rapid charge; however, the battery output is decreasing to some degree. Therefore, the electric vehicle control unit 7 supplies the fuel cell control device 6 with the output change command signal Q55, so that the fuel cell system provides a 5 kW output corresponding to a value for efficiency within the range of from 30 to 40%, which is still a high efficiency. Consequently, the fuel cell system 3 charges the battery 1 with an output of 5 kW (corresponding to B1—an efficiency of 32% in FIG. 7).

When the first flag, the second flag, and the third flag are determined not to be respectively ON, ON and OFF in step 20 ("N" in step 20), each flag is then checked to determine if ON, ON and ON respectively (step 22). When these flags are ON, ON and ON ("Y" in step 22), some charge is necessary to avoid reaching an excessively discharged state wherein the charge of the battery 1 is below 60% capacity and the output of the battery 1 is decreasing to some degree. The lowest acceptable efficiency output, 10 kW, is selected and the corresponding output change command signal Q510 is supplied to the fuel cell control device 6 from the electric vehicle control unit 7. Consequently, the fuel cell system 3 charges the battery 1 with an output of 10 kW (corresponding to C1—an efficiency of 30% in FIG. 7) which is the lowest efficiency within a predetermined range of acceptably high efficiency (step 23).

When the first flag, the second flag, and the third flag are not ON, ON and ON respectively in step 22 ("N" in step 22), the program returns to the main routine because the battery is charged to over 90% capacity. When the battery charge routine is repeated in this condition, the charge of the battery is detected (step 11), the first flag, the second flag, and the third flag become OFF one by one (step 24 to step 26) because the charge is not below 90% in step 12. In this case, because the battery is charged to over 90% capacity, the fuel cell system 3 ceases operation (step 27) and the program returns to the main routine.

Figure 4A:
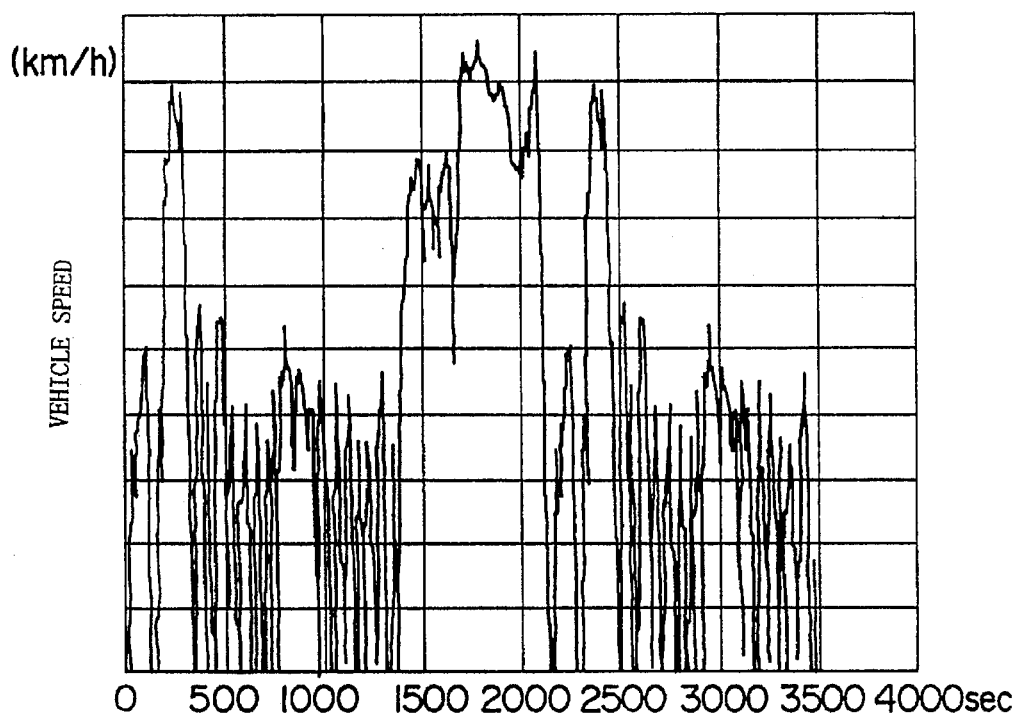
FIGS. 4(a) and 4(b) are graphical representations of movement of an electric vehicle employing the hybrid type power supply system.

As shown in FIG. 4(a), the electric vehicle travels with a variety of operational modes, including stopped, high speed and acceleration in accordance with degrees of operation of an accelerator pedal, braking and shift lever position.

Figure 4B:
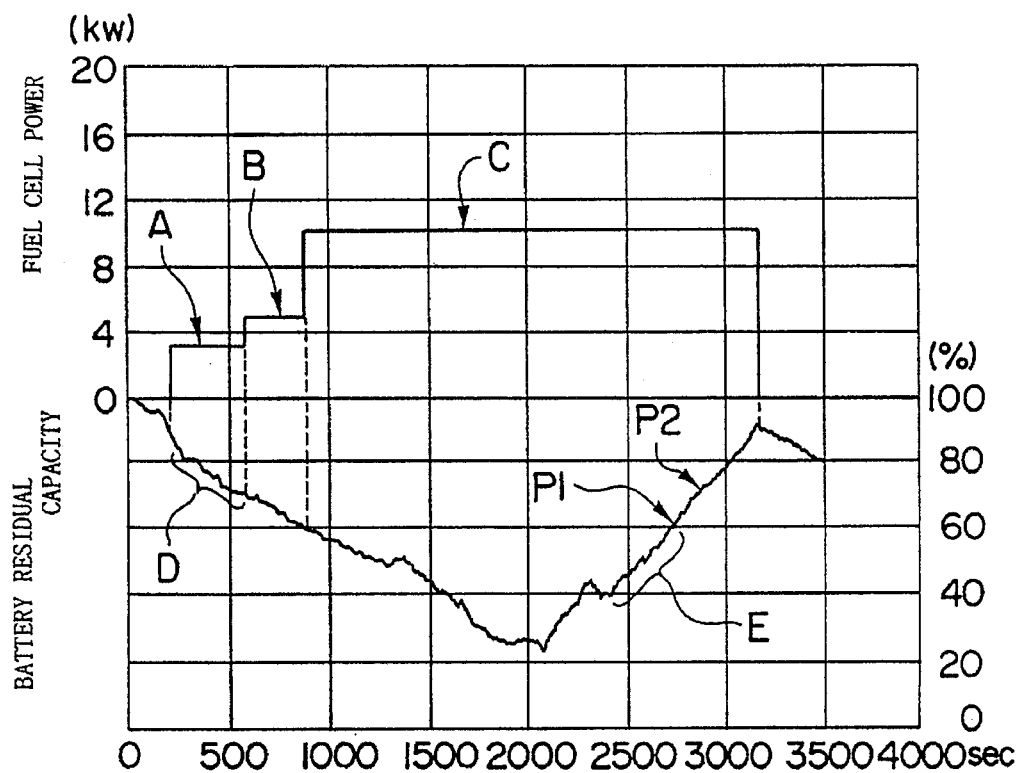

As shown in FIG. 4(b), control of the output of the fuel cell system 3 is independent of operation of the accelerator pedal but, rather, changes the output of the fuel cell system 3 between 3 kW (shown as A), 5 kW (shown as B) and 10 kW (shown as C), in accordance with the present charge (residual charge) of the battery 1 which increases and decreases according to vehicle operation.

Operated as described above, the fuel cell system 3 can generate electricity with a good efficiency within the range of from 30 to 33% and the battery 1 can be charged effectively.

Incidentally, because the control process, from step 12 to the step 17, does not contain an operation which turns a flag OFF, the output of the fuel cell system 3 does not change toward the low output side but changes toward the high output side, i.e. from 3 kW to 5 kW and from 5 kW to 10 kW. For example, when the output of the fuel cell system 3 is at 5 kW and the residual battery charge falls below 70% ("Y" in step 14), the second flag is turned ON and thereafter 5 kW is continued to be output if the battery charge does not fall below 60%, until the charge of the battery 1 exceeds 90% capacity. Once the output becomes 10 kW, 10 kW is continued to be outputted until the charge of the battery becomes 90% of battery capacity. For example, in FIG. 4(b) as the degree of charge increases from a value within range E, below 60% and exceeds P1 at 60% and P2 at 70%, 10 kW output is continued as shown by line C. The reason why the output of the fuel cell system 3 changes toward the high output side is the necessity to prevent battery life from deteriorating due to an exhaustion of the electrolytic solution when the charge of the battery 1 becomes excessively low. On the other hand, the reason why the output of the fuel cell system 3 does not change toward the low output side, even as the charge of the battery increases, is to prevent the fuel cell itself from deteriorating due to frequent change of the output of the fuel cell system 3, in accordance with change of the battery charge, after changing to a low output with an increase in the battery charge and to prevent the battery from deteriorating due to the repeated discharge.

In the first operation of the first embodiment, the battery 1, which has the capacity to respond to a load increase such as a rapid acceleration, is utilized to provide an output corresponding to the load requirement. The output of the fuel cell is not changed responsive to operation of the accelerator pedal but, instead, the battery residual charge is classified into one of plural ranges and the output of the fuel cell is set corresponding to that range in which the battery residual charge is classified. Because the output of the fuel cell changes gradually in accordance with a change in range of the battery residual charge, a frequent change in output of the fuel cell is avoided and thermal fatigue of the fuel cell due to repeated change in output is also avoided.

When the efficiency of the fuel cell system 3 is regarded as more important than high output from the fuel cell system 3, the output of the fuel cell system 3 may be changed toward the low output side, e.g. from 10 kW (line C) to 5 kW (line B) at P1 and to 3 kW (line A) at P2, with an increase of the battery residual charge. In this case, however, to prevent a frequent change of the output at the 90%, 70% and 60% values for residual charge capacity, the battery charge routine may be repeated only after a lapse of a fixed time period, e.g. hourly.

Furthermore, the values of 90%, 70% and 60% may each be assigned a fixed range to allow for fluctuation in the charge of the battery 1. For example, if 90% is a given range of ±1%, 89% would be the point where the charging rate of the battery decreases and 91% would be where it increases. In this case, to determine permissible fluctuation, it is necessary to keep a history of the charge of the battery 1 over a fixed period of time and that history is stored in RAM (not shown) in the electric vehicle control unit 7.

The second operation of the first embodiment changes the previous output value of the fuel cell to a higher range and the battery 1 is charged taking into account allowable fluctuation in the residual charge of the battery 1 computed by the electric vehicle control unit 7. The main routine for overall operation remains as shown in FIG. 2.

Figure 5:
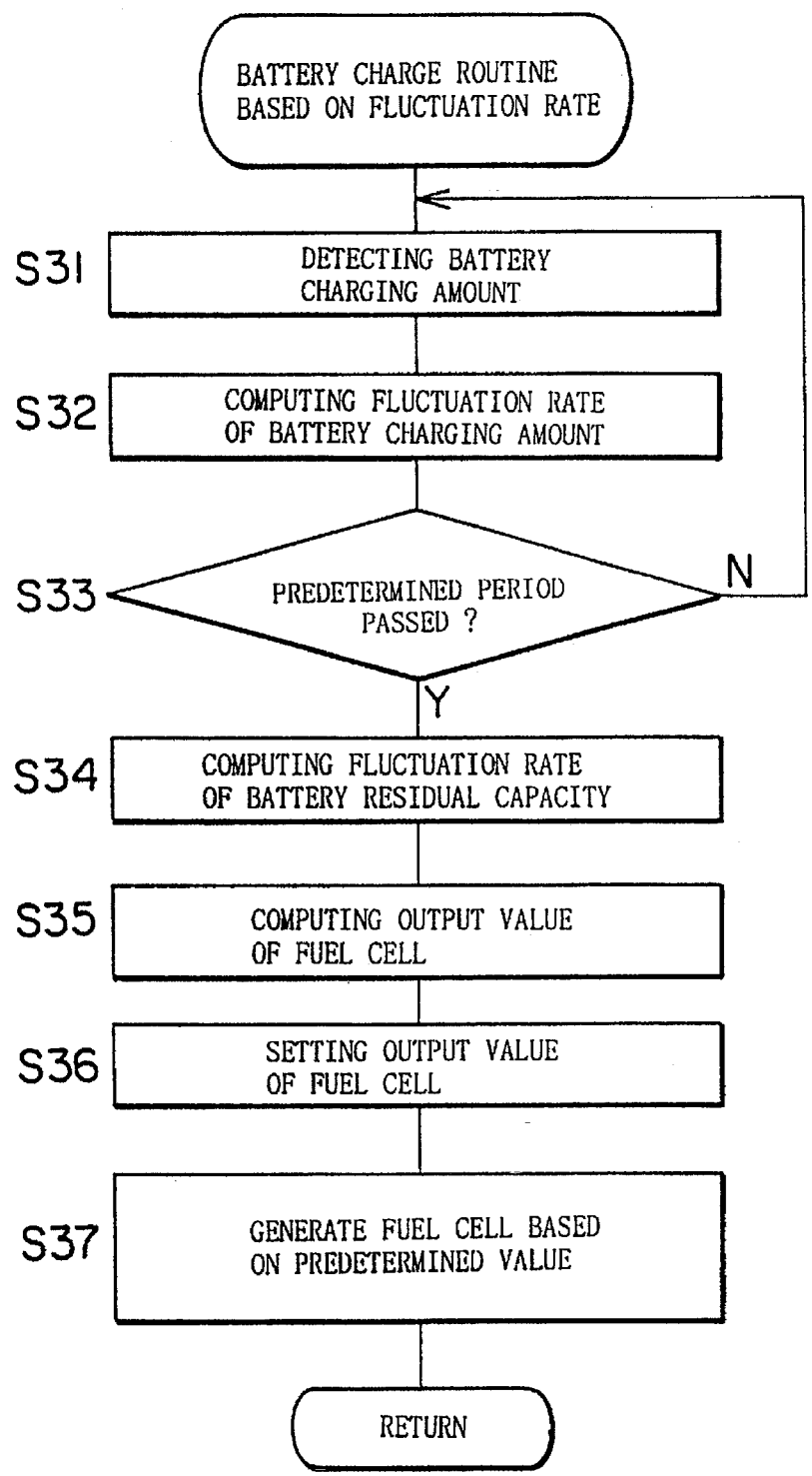
FIG. 5 is a flow chart showing another battery charge routine which may be used in the first embodiment.
Figure 6:
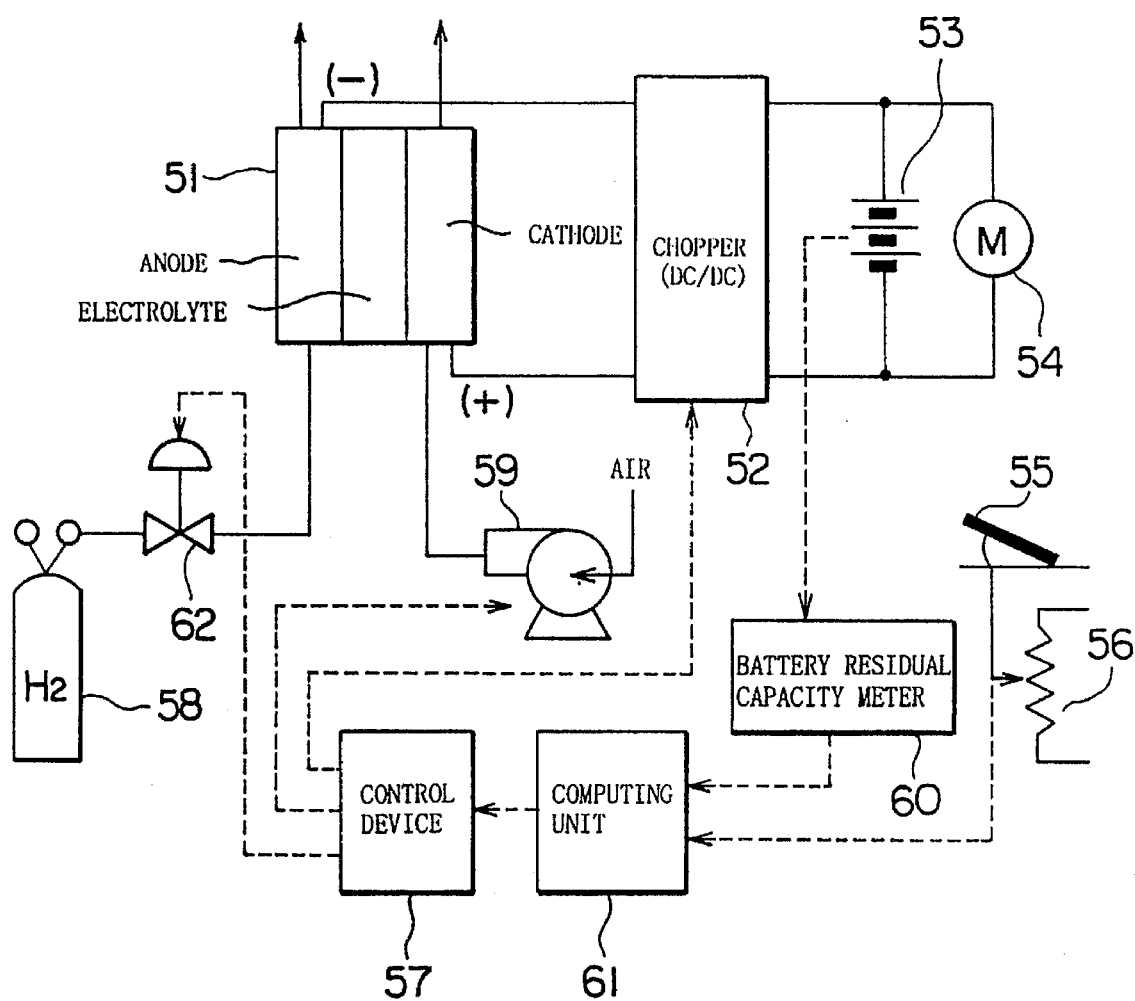
FIG. 6 is a block diagram showing an example of a conventional hybrid type power source.

As shown in FIG. 5, the residual charge of the battery 1 is computed by the battery residual charge computing unit 4 from a value for consumption of electric power from the battery 1 and a value for total output of the fuel cell system 3 and the computed value is supplied to the electric vehicle control unit 7 (step 31).

The electric vehicle control unit 7 computes the net change in the battery charge (step 32).

Provided a predetermined time period has passed (step 33), the electric vehicle control unit 7 next computes the rate of change in the battery residual charge (step 34) and determines an output change command signal Q5 based on the amount of residual charge of the battery 1 computed in step 31 and the rate of change in the battery residual charge computed in step 34 (step 35).

In response to the value of the output change command signal Q5 (Q53, Q55 or Q510), the fuel cell control device 6 outputs the output value setting signal Q4 (step 36) and a methanol feeding adjustment signal Q3 and, therefore, the fuel cell system 3 charges battery 1 by an output based on a set point (step 37) and returns to the main routine.

FIGS. 8(a) and 8(b) tabulate the output change command signals Q5 supplied to the fuel cell control device 6 in accordance with the residual charge and the rate of change of the residual charge of the battery 1. FIG. 8(a) shows that the battery residual charge is decreasing (as at "D" in FIG. 4(b)) and FIG. 8(b) shows that the battery residual charge is increasing (as at E in FIG. 4(b)).

The electric vehicle control unit 7 supplies the output change command signal Q5 to the fuel cell control device 6 according to the charts of FIGS. 8(a) and 8(b). For example, when the residual charge of the battery 1 decreases with a low charging rate and a high discharge rate, Q510 is supplied to the fuel cell control device 6 as the output change command signal Q5 to prevent a discharge. Accordingly, the battery 1 is charged with 10 kW input from the fuel cell system 3.

When the amount of residual charge of the battery is decreasing, the battery 1 is charged at a high fuel cell output because the decrease rate is high and when the amount of charge, conversely, is increasing, the battery 1 is charged at a low fuel cell output because the increase rate is high.

However, while the described changeover points are fixed so that over 90% is high, below 90% and over 70% is middle, and below 60% is low, other ranges can be selected. A range for the permissible fluctuation and the number of transition points (number of ranges or levels of charge) can be optionally selected and furthermore the value of the signal Q5 corresponding to a given level of charge amount of the battery 1 can be fixed arbitrarily.

As the electric motor M is run directly by the electric power of the battery 1, in response to a command from the accelerator pedal in this embodiment, the drive system can react with good response.

In the embodiment described above, in accordance with the condition of the battery 1, a 3 kW, 5 kW or 10 kW output is selected for the fuel cell system 3 within a range of "high", e.g. 30% to 40%, overall system efficiency ("composite efficiency"). However, other values, e.g. 10 values within a range of 4 kW–12 kW, can be chosen.

The battery residual charge dictates changes in the output of fuel cell system 3 when reaching 90%, 70% and 60% of capacity; however, over 4 values can be fixed as values for the battery residual charge which signal a change in the voltage output by the fuel cell system 3.

When the output of the fuel cell is changed in accordance with a change in the load commanded for the vehicle, the output of the fuel cell increases responsive to a high load demand, e.g. in an acceleration and in high speed travel, but moves to operation in low range for the system composite efficiency (below 30%). When the output of the fuel cell is decided by adding the vehicle load command (by operation of the accelerator pedal) to a signal from the residual charge meter, the fuel cell is operated in the lower efficiency range. On the other hand, in the first embodiment the output value of the fuel cell system 3 can be selected without influence of operation of the accelerator pedal or change in the load commanded for the vehicle.

Figure 10:
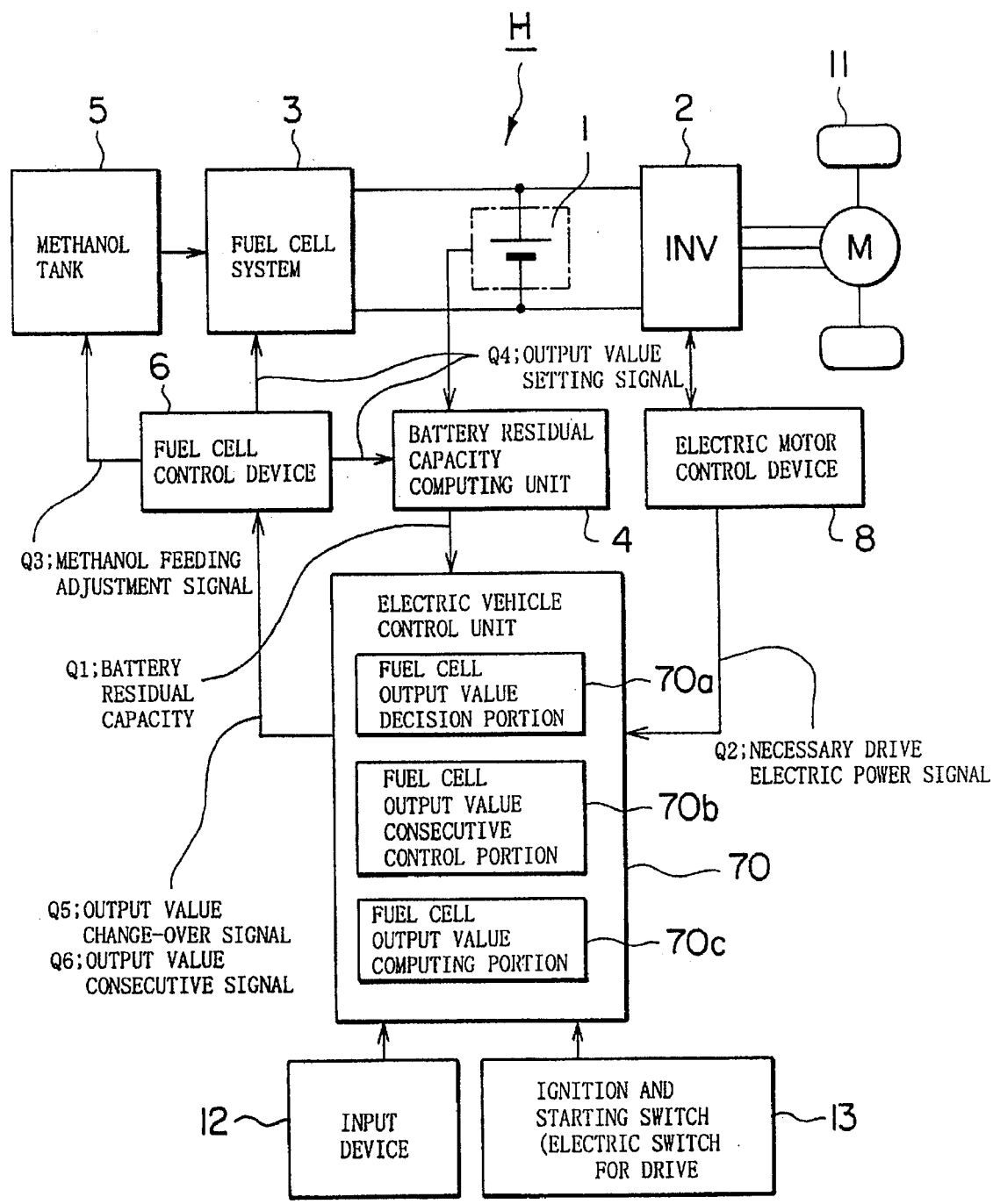
FIG. 10 is a block diagram showing a hybrid type power system for an electric vehicle in accordance with a second embodiment of the invention.

FIG. 10 depicts a system configuration for a second embodiment of a hybrid H-type power supply system for an electric vehicle in accordance with the present invention. The same reference numerals will be used to designate the same or similar components as those shown in FIG. 1 for the first embodiment, so that the description will be omitted or simplified.

As shown in this FIG. 10, the power supply system of the second embodiment includes an input device 12 and an ignition and starting switch 13. The input device 12 inputs a charge time and other signals and is provided with a ten-key pad. The ignition and starting switch (drive electric power switch) 13 of this embodiment functions as an ON/OFF switch for the electric power source and functions as a part of an approval means.

The power supply system of the second embodiment (H-type hybrid system) is provided with an electric vehicle control unit 70 as in the first embodiment. The electric vehicle control unit 7 is provided with a fuel cell output value decision subunit 70a, functioning as a fuel cell output control means, a fuel cell output value consecutive control subunit 70b, and a fuel cell output value computing subunit 70c.

The fuel cell output value decision subunit 70a decides the output value (3 kW, 5 kW or 10 kW) of the fuel cell system for charging the battery 1 based on the present charge of the battery 1 which is computed by the battery residual charge computing unit 4 and sends the decided output value to the fuel cell control device 6 as the output change command signal Q5.

The fuel cell output value consecutive control subunit 70b controls the charging output at 3 kW, 5 kW or 10 kW based on the output change command signal Q5 when the drive electric power switch (ignition and starting switch) 13 is OFF.

The fuel cell output value computing subunit 70c computes the output for the fuel cell system 3 which is necessary for the battery 1 to become fully charged (for example, 90% capacity) over a period of time input from the input device 12, given the battery residual charge signal Q1 supplied from the battery residual charge computing unit 4 when the ignition and starting switch 13 is OFF.

Figure 11:
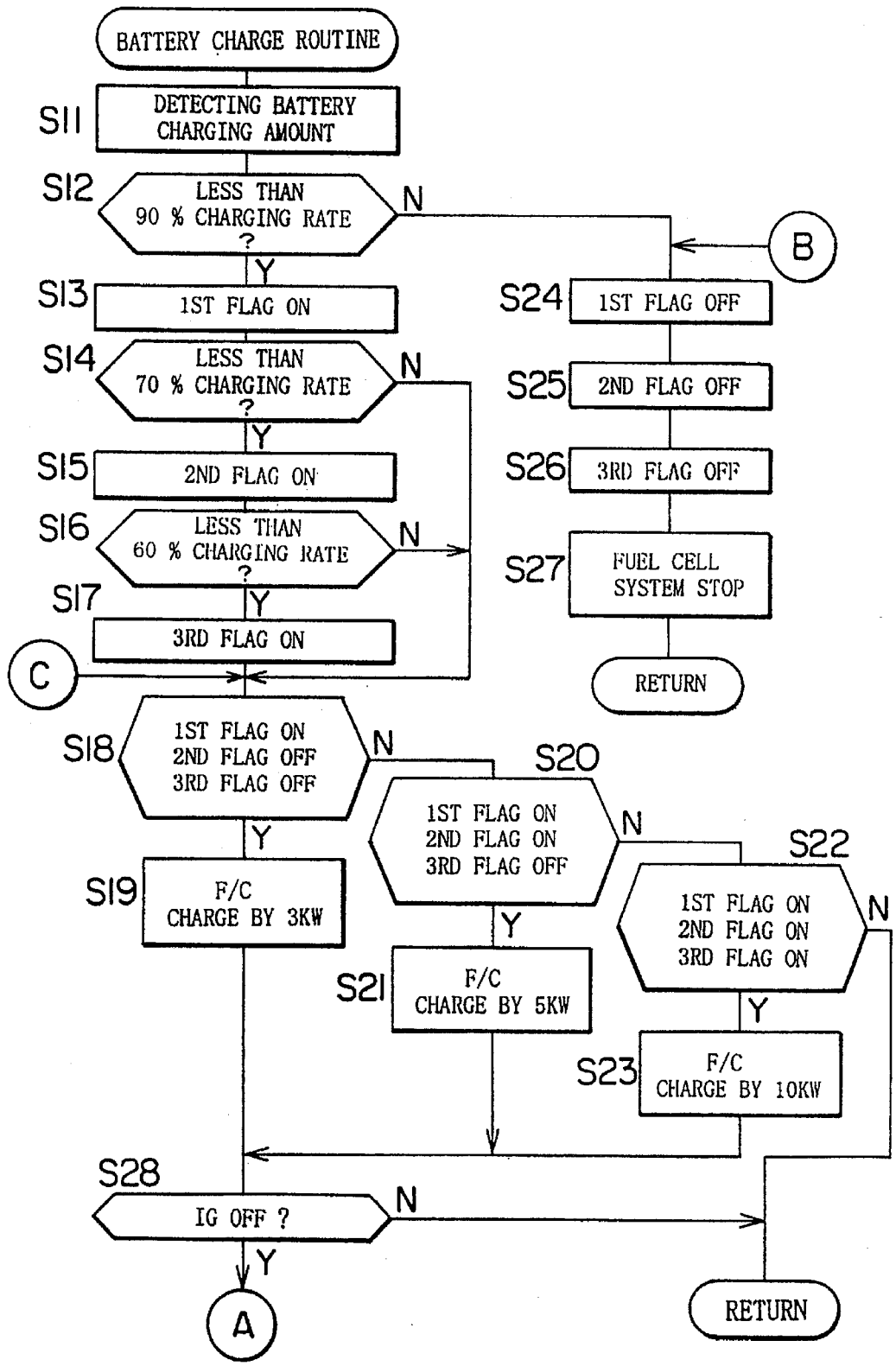
FIG. 11 is a flow chart showing a charge mode in which the battery is charged in the second embodiment.
Figure 12:
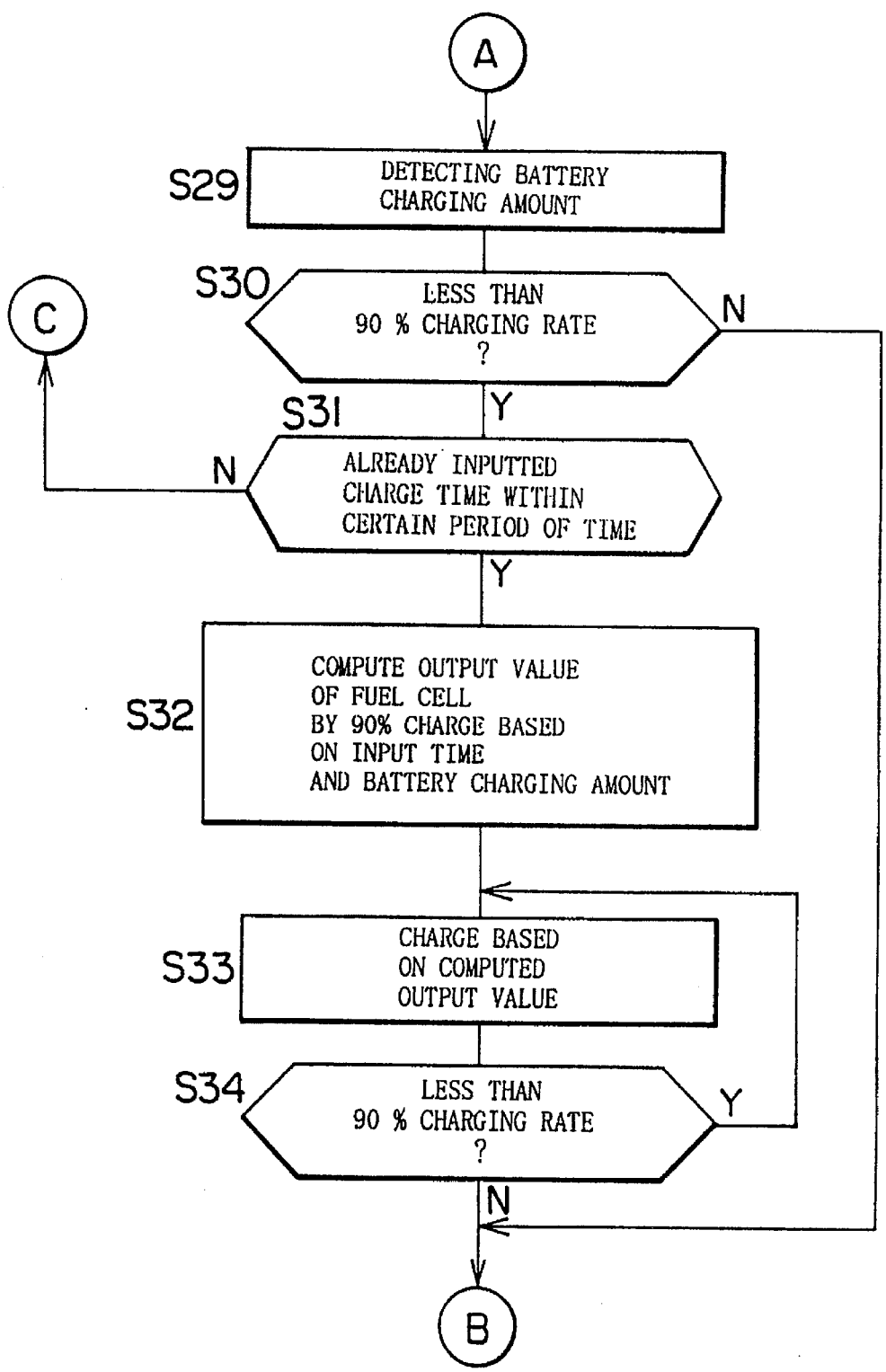
FIG. 12 is a continuation of the flow chart depicted in FIG. 11.

Next, operation of the H-type hybrid power supply system of the second embodiment will be explained referring to FIG. 11 and FIG. 12.

The operation of the system of the second embodiment is also divided into first and second control sequences. The first control sequence may be initiated when the ignition and starting switch 13 is ON and consists mainly of steps S11 through S28. The second control sequence may be initiated when the switch 13 is OFF and consists mainly of steps S18 through S34.

The first control sequence, when the ignition and starting switch 13 is ON, detects residual charge of the battery 1 (S11) and instructs the fuel cell system 3 to output at a level corresponding to the detected residual charge when the electric motor M can move, that is when the electric vehicle can be moved by the electric motor M responsive to operation of the accelerator pedal.

Because the second control sequence is almost the same as in the first embodiment, the same step numbers will be used to designate the same or similar operational steps as those in the first embodiment, so that the description will be omitted.

The second control sequence is that which occurs when the ignition and starting switch 13 is OFF (the motor is disapproved—"Y" in step 28). When the ignition and starting switch 13 is turned from ON to OFF, two options are presented: (1) to automatically continue the output of the fuel cell system 3 and (2) to manually set and input a charge time from the input device 12.

(1) Automatic Continuation of the Output of the Fuel Cell System 3.

In this operation the input device 12 is not utilized to input a fixed time when the ignition and starting switch 13 is OFF. As shown in FIG. 11 and 12, when the electric vehicle control unit 70 detects IG OFF for the ignition and starting switch 13 ("Y" in step 28), it charges the battery 1 automatically during the disapproval time of the electric motor M, that is, when the motor is not running, as when the vehicle is parked. In this operation, the battery residual capacity computing unit 4 detects the residual battery charge (step 29) and, when the charge is below 90% capacity ("Y" in step 30) and there is no input of a fixed charge time from the input device 12 ("N" in step 31), the routine returns to step 18 and checks the 1st, 2nd and 3rd flags held in RAM. Each flag indicates that a previous condition remains satisfied as in steps 18, 20 and 22, respectively. When the flags are ON, OFF and OFF, respectively, ("Y" in step 18), 3 kW is continued to be output from the fuel cell stack (step 19). When the flags are ON, ON and OFF ("Y" in step 20), 5 kW is continued to be output (step 21), and when ON, ON and ON, respectively, ("Y" in step 22), 10 kW is continued to be output (step 23).

In step 29, when the battery residual charge is detected as over 90% capacity ("N" in step 30), the routine jumps to step 24 and each flag becomes OFF one by one (steps 24 to 26), operation of the fuel cell system 3 is stopped (step 27), and the routine returns (resets).

(2) Manual Setting and Inputting of the Charge Time From the Input Device 12.

In this operation the ignition and starting switch 13 is determined in step 28 to be OFF and thereafter a fixed charge time is input from the input device 12. As shown in FIGS. 11 and 12, after the ignition and starting switch 13 is OFF ("Y" in step 28), the battery residual charge is detected (step 29) and the electric vehicle control unit 70 checks whether the residual charge is below 90% ("Y" in step 30).

When there is an input of a fixed charge time ("Y" in step 31), the fuel cell output value computing subunit 70c of the electric vehicle control unit 70 computes the output value for the fuel cell system 3 which is necessary for charging to more than 90% of the battery capacity over the charge time input from the input device 12 and given the battery residual charge detected in step 11 and supplied from the battery residual capacity computing unit 4 (step 32).

The output value computed in step 32 is supplied to the fuel cell control device 6 as output change command signal Q5 and, responsive to signal Q5, the methanol feed adjustment signal Q3 and the output value setting signal Q4 are output from the fuel cell control device 6 to the methanol tank 5 and the fuel cell system 3, respectively. The electric vehicle control unit 70 turns each flag OFF one by one (step 24 to 26), stops output of the fuel cell system 3 (step 27), and the routine returns.

For example, a parking time for shopping and other chores (for example, 4 hours) may be input from the input device 12 by a driver and a 10 kW output, which is at a slightly lower efficiency, is used to charge the battery if the residual charge is 60% or less. On the other hand, if input time is longer, for example, 8 hours, an output of 3 kW from the fuel cell system would be sufficient to charge to 90% capacity and would be utilized for its higher efficiency, provided the battery residual charge is at least 60%.

The input device 12 provides for inputs of 4 hours, 6 hours, 8 hours and more than 8 hours for the charge time in manual mode and can also set the charge time in increments of 30 minutes or hours. While the above-described embodiment sets the output value in manual mode at 3 kW, 5 kW and 10 kW, a different input device 12 may be utilized to change the output of the fuel cell system 3 by single kW units.

If the result of computation by the fuel cell output value computing subunit 70c exceeds 10 kW, the output value signaled by Q4 may be set at 10 kW even though fuel cell efficiency is thereby sacrificed.

An on-off switch (not-shown) functions as on-off means (make or break connection) arranged between the battery 1 and the inverter 2 and this switch is either ON or OFF in accordance with an input from the ignition and starting switch 13.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hybrid type power source for an electric vehicle, comprising:

a rechargeable battery for supplying electric power to drive an electric motor;

a fuel cell for generating electric power to charge said battery;

battery residual charge detection means for detecting the residual charge contained in said battery; and fuel cell output control means for defining a plurality of different ranges of residual battery charge, for determining which one range of the plurality of ranges encompasses the detected residual charge and for commanding the fuel cell to charge the battery at one of a plurality of different power levels corresponding, respectively, to the plurality of different ranges of residual battery charge, each of said power levels serving to charge the battery, which one power level remains constant so long as the detected residual charge remains within said one range.

2. A hybrid type power source according to claim 1, wherein said plurality of different power levels are defined on the basis of a predetermined correlation between power output and efficiency of said fuel cell in converting fuel to electric power for driving the electric motor.

3. A hybrid type power source according to claim 1, further comprising:

electric power detection means for detecting the amount of electric power demanded for driving the vehicle;

fuel cell output detection means for detecting electric power generated by said fuel cell; and wherein said battery residual charge detection means determines the battery residual charge as a function of the electric power detected by said electric power detection means and the electric power detected by said fuel cell output detection means.

4. A hybrid type power source according to claim 1 further comprising:

approval means for operating said electric motor by permitting flow of current to said electric motor;

approval state detection means for detecting operation of the electric motor; and wherein said fuel cell output control means commands the fuel cell to charge the battery at said one power level, when a signal from said approval state detection means indicates that the electric motor is inoperative.

5. A hybrid type power source according to claim 4, wherein said approval means includes on-off means for connecting and disconnecting said electric motor to and from said battery and a switch for operating said on-off means.

6. A hybrid type power source according to claim 4, further comprising electric power detection means for detecting electric power demanded for driving the electric motor and fuel cell output detection means for detecting electric power generated by said fuel cell, and wherein said battery residual charge detection means detects the battery residual charge as a function of both the demanded electric power detected by said electric power detection means and the generated electric power detected by said fuel cell output detection means.

7. A hybrid type power source according to claim 4, further comprising electric power detection means for detecting electric power demanded for driving the electric motor and fuel cell output detection means for detecting electric power generated by said fuel cell, and wherein said battery residual charge detection means detects the battery residual charge as a function of both the demanded electric power detected by said electric power detection means and the generated electric power detected by said fuel cell output detection means.

8. A hybrid type power source according to claim 1, further comprising:

charge time input means for setting and inputting a charging time for the battery by output of said fuel cell;

motor operation detection means for detection of an operative state or an inoperative state of the electric motor; and wherein said fuel cell output control means determines a command signal to said fuel cell in accordance with a targeted, fixed residual charge of the battery, the detected battery residual charge and the charge time input from said charge time input means, provided the inoperative state of the electric motor is detected.

9. A hybrid type power source according to claim 4, wherein said battery residual charge detection means detects a rate of change of the battery residual charge, and wherein said fuel cell output control means determines the command to said fuel cell in accordance with the detected rate of change.

* * * * *